US 12,530,974 B2

(12) United States Patent
Roman et al.

(10) Patent No.: US 12,530,974 B2
(45) Date of Patent: Jan. 20, 2026

(54) SYSTEM AND PROCESS FOR CORRECTING NOTAMS USING A TRAINED MACHINE LEARNING ALGORITHM

(71) Applicant: Frequentis AG, Vienna (AT)

(72) Inventors: Catalin-Horatiu Roman, Vienna (AT); Miruna-Maria Morarasu, Vienna (AT)

(73) Assignee: FREQUENTIS AG, Vienna (AT)

( * ) Notice: Subject to any disclaimer, the term of this patent is extended or adjusted under 35 U.S.C. 154(b) by 267 days.

(21) Appl. No.: 18/142,796

(22) Filed: May 3, 2023

(65) Prior Publication Data

US 2023/0360540 A1 Nov. 9, 2023

(51) Int. Cl.
*G06N 3/08* (2023.01)
*G06N 3/0442* (2023.01)
(Continued)

(52) U.S. Cl.
CPC .............. *G08G 5/21* (2025.01); *G06N 3/0442* (2023.01); *G06N 3/08* (2013.01); *G08G 5/20* (2025.01);
(Continued)

(58) Field of Classification Search
CPC .. G08G 5/21; G08G 5/25; G08G 5/51; G08G 5/32; G08G 5/34; G08G 5/20; G08G 5/26;
(Continued)

(56) References Cited

U.S. PATENT DOCUMENTS 11,341,332 B2 * 5/2022 Hein .................. G08G 5/21
11,984,035 B2 * 5/2024 Soukarie ............ G08G 5/56
(Continued)

FOREIGN PATENT DOCUMENTS

AT 517443 A1 1/2017
AU 2023202791 A1 * 11/2023 ............... G08G 5/20
(Continued)

OTHER PUBLICATIONS

Altitude Angel—Accurate NOTAM Parsing and Why You Should Care, from https://www.altitudeangel.com/news/accurate-notam-parsing-and-why-you-should-care; published Apr. 16, 2018. (Year: 2018).*

(Continued)

*Primary Examiner* — Cuong H Nguyen
(74) *Attorney, Agent, or Firm* — 24IPUSA Law Group, PLLC; Timothy R DeWitt

(57) ABSTRACT

A computer-implemented method for correcting initial NOTAM-messages using a trained machine-learning algorithm, comprising: inputting a plurality of initial NOTAM-messages from a plurality of data sources, identifying, from the E-field and using the trained machine-learning algorithm, a plurality of permissible values for the traffic, the purpose, scope, first NOTAM-code-component, and second NOTAM-code-component; selecting a preferred value for one or more of the traffic, purpose, scope, first NOTAM-code-component, and second NOTAM-code-component, wherein selecting of the preferred value is done using a set of probabilities; and setting the selected value for the traffic, purpose, scope, first NOTAM-code-component, and second NOTAM-code-component as corrected values for the traffic, purpose, scope, first NOTAM-code-component, and second NOTAM-code-component to produce corrected NOTAM-message. The initial NOTAM-messages comprises at least a Q-field and an E-field. The E-field comprises a string describing a content of the initial NOTAM-messages.

20 Claims, 5 Drawing Sheets

US 12,530,974 B2

Page 2

(51) Int. Cl.
*G08G 5/20* (2025.01)
*G08G 5/21* (2025.01)
*G08G 5/22* (2025.01)
*G08G 5/26* (2025.01)
*G08G 5/32* (2025.01)
*G08G 5/34* (2025.01)

(52) U.S. Cl.
CPC .............. *G08G 5/22* (2025.01); *G08G 5/26* (2025.01); *G08G 5/32* (2025.01); *G08G 5/34* (2025.01)

(58) Field of Classification Search
CPC .......... G08G 5/22; G08G 5/56; G06N 3/0442; G06N 3/08
See application file for complete search history.

(56) References Cited

U.S. PATENT DOCUMENTS

| | | | | |
|---|---|---|---|---|
| 12,106,675 | B2 * | 10/2024 | Foo | G08G 5/21 |
| 2020/0342058 | A1 * | 10/2020 | Hein | G06F 40/205 |

FOREIGN PATENT DOCUMENTS

| | | | | |
|---|---|---|---|---|
| CN | 115481638 | A * | 12/2022 | |
| CN | 110989649 | B * | 7/2023 | ........... G05D 1/0825 |
| CN | 118332138 | B * | 10/2024 | ........... G06N 3/0442 |
| EP | 4273838 | A1 * | 11/2023 | ............... G08G 5/20 |
| KR | 102003321 | B1 * | 7/2019 | ............... H04L 43/04 |
| WO | WO-2021133246 | A1 * | 7/2021 | ........... G08G 5/0008 |

OTHER PUBLICATIONS

An English-translated version for KR102003321B1 by Lee Ji Min et al.(Asiana IDT Inc). (Year: 2019).*
Morărau, Miruna Maria, and Cătălin Horaiu Roman. "AI-driven Optimization of Operational NOTAM Management." 2024 Integrated Communications, Navigation and Surveillance Conference (ICNS). IEEE, 2024. (Year: 2024).*
Prokhorov, A. V. "Impact of NOTAM on security and efficiency performance of flights (overview)." Научный вестник Московского государственного технического университета гражданской авиации 25.1 (2022): 21-34. (Year: 2022).*
Rosa, Ilaria. Leveraging Machine Learning and Language Models to Assess the Importance of Notices to Air Missions (NOTAMs). MS thesis. NTNU, 2024. (Year: 2024).*
M. M. Morărau and C. H. Roman, "Transforming Notams to Digital Notams: an Ai-Powered Approach to Enhance Aeronautical Information Management," 2025 Integrated Communications, Navigation and Surveillance Conference (ICNS), Brussels, Belgium, 2025, pp. 1-6, doi: 10.1109/ICNS65417.2025.10976803.(Year: 2025).*
Alexandre Arnold, Gérard Dupont, Catherine Kobus, François Lancelot, and Pooja Narayan. 2019. Interprétation et visualisation contextuelle de NOTAMs (messages aux navigants aériens) (). In Actes de la Conférence sur le Traitement Automatique des Langues Naturelles (TALN) PFIA 2019. vol. IV : Démonstrations, pp. 639-643, Toulouse, France. ATALA.
Anonymous: "Altitude Angel—Accurate NOTAM parsing, and why you should care SUAS News—The Business of Drones" sUAS News, Apr. 16, 2018.
Antonio Locandro: "NOTAM—Radius of Influence" Published Sep. 24, 2019.

* cited by examiner

(A0070/21 NOTAMN

Q) AYPM/QWWLW/IV/NBO/W/000/999/0444S15030E999
         ↑     ↑  ↑   ↑         ↑
         25d  25a 25c
              25e  25b

A) AYPM

B) 2101050100

C) 2101070600EST

30 →

E) CTN. MANAM VOLCANO COORD S04 04 39 E145 02 21
EMITTING VA AND FU
UP TO 14000FT MOVING WNW.PILOT REP.

F) SFC

G) UNL)

SYSTEM AND PROCESS FOR CORRECTING NOTAMS USING A TRAINED MACHINE LEARNING ALGORITHM

CROSS-REFERENCE TO OTHER APPLICATION

The present application claims the benefit of the filing date of European patent application 22171918 "SYSTEM AND PROCESS FOR CORRECTING NOTAMS USING A TRAINED MACHINE LEARNING ALGORITHM", filed on 5 May 2022. The entire disclosure of European patent application 22171918 is hereby incorporated herein by reference in its entirety.

BACKGROUND OF THE INVENTION

Field of the Invention

The present disclosure relates to a system and method for automatically correcting NOTAM-messages using a trained machine-learning algorithm.

Brief Description of the Related Art

Routes of airplanes and other air-bound vehicles are often subject to change even when a flight is already on route. These changes are communicated to the airplanes and other air-bound vehicles by standardized messages termed "NOTAM-messages" (NOTAM being an acronym for "Notice to Airmen" or "Notice to Air Mission"). The NOTAM-messages are filed with an aviation authority and alert the airplanes and other ones of the air-bound vehicles to potential issues along a flight route or location that could affect the flight. The potential issues include information concerning the establishment, conditions or change in any aeronautical facility, service, procedure, or hazard. The NOTAM-messages are unclassified notices or advisories and distributed by telecommunication channels. The timely and correct knowledge of the NOTAM-messages is relevant to personnel and systems concerned with flight operations.

The NOTAM-messages are sent in all-uppercase letter text-format and comprise different fields of semi-standardized content. A number of different aviation authorities release NOTAM-messages around the globe at any point in time. It has been found that the quality and accuracy of the NOTAM-messages varies significantly. The main factors for the quality and the accuracy of the NOTAM-messages are, for example, a region or aviation authority from which the NOTAM-message is issued, and the tools and processes used in this issuing of the NOTAM-messages. In some locations, the content of the NOTAM-messages is encoded by hand and the NOTAM-messages can therefore be erroneous or incomplete. These erroneous or incomplete NOTAM-messages can lead to perturbances in flight operations and may even pose a safety risk, especially when viable information regarding possible threats to the airplanes or the air-bound vehicles are overlooked.

There are different approaches known in the prior art for classifying the NOTAM-messages and generating standardized items of data from these classified NOTAM-messages.

For example, Austrian patent application No. AT 517443 A1 teaches a method for displaying relevant information in an aircraft during flight. A flight route is predetermined which specifies the planned temporal, local and altitudinal course of movement of the aircraft. A basic set of data records is then selected from the flight information database on the basis of an initial query defined by the predetermined flight route. This basic set is then transmitted to an indication database located in the aircraft. An update query is created for data records which have been inserted, modified, or deleted in the flight information database exclusively after the execution of the initial query or the last update query. The update query is then executed by the flight information database and the data records determined on the basis of the update query are transmitted to a display database located in the aircraft. The display database is then updated on the basis of the data records and the data records of the display database are then displayed in the aircraft.

US Patent Application Publication No. 2020/342058 A1 discloses a system and method for automatic prediction and generation of a Q-Code based on a text description provided in a NOTAM. The system is used to generate a Q-Code from a text description or to verify and/or confirm a human-generated Q-Code based on the text description in a NOTAM. The method comprises the steps of pre-processing the text description from the NOTAM, applying a learned classifier model to the pre-processed text from the NOTAM, mapping an output from the classifier model to generate a corresponding Q-Code, and displaying the generated Q-Code.

The prior art discloses solutions for analyzing the NOTAM-messages and displaying information from these analyzed NOTAM-messages. The prior art, however, does not disclose a computer-implemented method for correcting NOTAM-messages using a trained machine-learning algorithm.

SUMMARY OF THE INVENTION

The present document describes a computer-implemented method for correcting NOTAM-messages using a trained machine-learning algorithm. The method according to one aspect comprises the step of inputting a plurality of NOTAM-messages from a plurality of data sources. The NOTAM-messages comprise at least a Q-field and an E-field. The Q-field comprises items of data relating to at least one of a traffic, a purpose, a scope, a first NOTAM-code-component, and a second NOTAM-code-component. The E-field comprises a string describing a content of the NOTAM-messages.

The method further comprises the step of identifying, from the E-field and using the trained machine-learning algorithm, a plurality of permissible values for the traffic, the purpose, the scope, the first NOTAM-code-component, and the second NOTAM-code-component.

The method also comprises the step of selecting a preferred value for one or more of the traffic, the purpose, the scope, the first NOTAM-code-component, and the second NOTAM-code-component. The selecting of the preferred value is done using a set of probabilities. The method further comprises the step of setting the selected value for the traffic, the purpose, the scope, the first NOTAM-code-component, and the second NOTAM-code-component as corrected values for the traffic, the purpose, the scope, the first NOTAM-code-component, and the second NOTAM-code-component to produce the corrected NOTAM-message.

The computer-implemented method according to one aspect further comprises parsing the input plurality of NOTAM-messages. The parsing comprises identifying at least the Q-field and the E-field in the NOTAM-messages.

The computer-implemented method according to one aspect further comprises pre-processing the input plurality of NOTAM-messages.

The computer-implemented method according to one aspect further comprises updating the trained machine-learning algorithm using at least one of the corrected values for the traffic, the purpose, the scope, the first NOTAM-code-component, and the second NOTAM-code-component and at least one of the input plurality of NOTAM-messages, the parsed input plurality of NOTAM-messages, or the pre-processed input plurality of NOTAM-messages.

The updating according to one aspect of the computer-implemented method further comprises validating at least one of the corrected values for the traffic, the purpose, the scope, the first NOTAM-code-component, and the second NOTAM-code-component.

The computer-implemented method according to one aspect, wherein the trained machine-learning algorithm comprises a single multi-output long short-term memory neural network.

A computer-implemented method for training of a machine-learning algorithm according to a further aspect comprises the step of inputting a plurality of NOTAM-messages. The input plurality of NOTAM-messages comprise initial NOTAM-messages and corresponding validated NOTAM-messages. The initial NOTAM-messages and the corresponding validated NOTAM-messages comprise at least a Q-Field and an E-field, wherein the Q-field comprises items of data relating to at least one of a traffic, a purpose, a scope, a first NOTAM-code-component, and a second NOTAM-code-component, and wherein the E-field comprises a string describing a content of the NOTAM-messages. The method according to a further aspect comprises the step of pre-processing the initial NOTAM-messages. The method according to a further aspect comprises the step of encoding the initial NOTAM-messages. The encoding comprises setting binary values for the items of data of the Q-field of the input pre-processed initial NOTAM-messages. The method according to a further aspect comprises the step of training the machine-learning algorithm based on the set values for the items of data of the Q-field of the input encoded initial NOTAM-messages and the values for the items of data of the Q-field of the validated NOTAM-messages.

The computer-implemented method according to a further aspect further comprises the step of parsing the initial NOTAM-messages and the corresponding validated NOTAM-messages, wherein the parsing comprises identifying at least the Q-field and the E-field.

The computer-implemented method according to a further aspect further comprises the step of pre-processing the E-field of the initial NOTAM-messages.

The encoding of the Q-field of the initial NOTAM-messages is done using one-hot encoding in one non-limiting aspect.

This document also discloses a data processing apparatus for carrying out the method as well as a computer program with instructions which, when the program is executed by the data processing apparatus, cause the data processing apparatus to carry out the method. The computer program is stored on a computer-readable medium.

The method is used for correcting NOTAM-messages in flight planning operations, in air traffic control, and providing information to pilots. The corrected NOTAM-messages enable improved flight planning to reduce fuel usage and increase safety of flight operations. Using the corrected NOTAM-messages more reliable flight operations are possible. The corrected NOTAM-messages lead to faster processing of the data as it is not necessary to correct and process the data again.

DESCRIPTION OF THE FIGURES

FIG. 2 shows an exemplary reproduction of a NOTAM-message.

DETAILED DESCRIPTION OF THE INVENTION

The invention will now be described on the basis of the figures. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
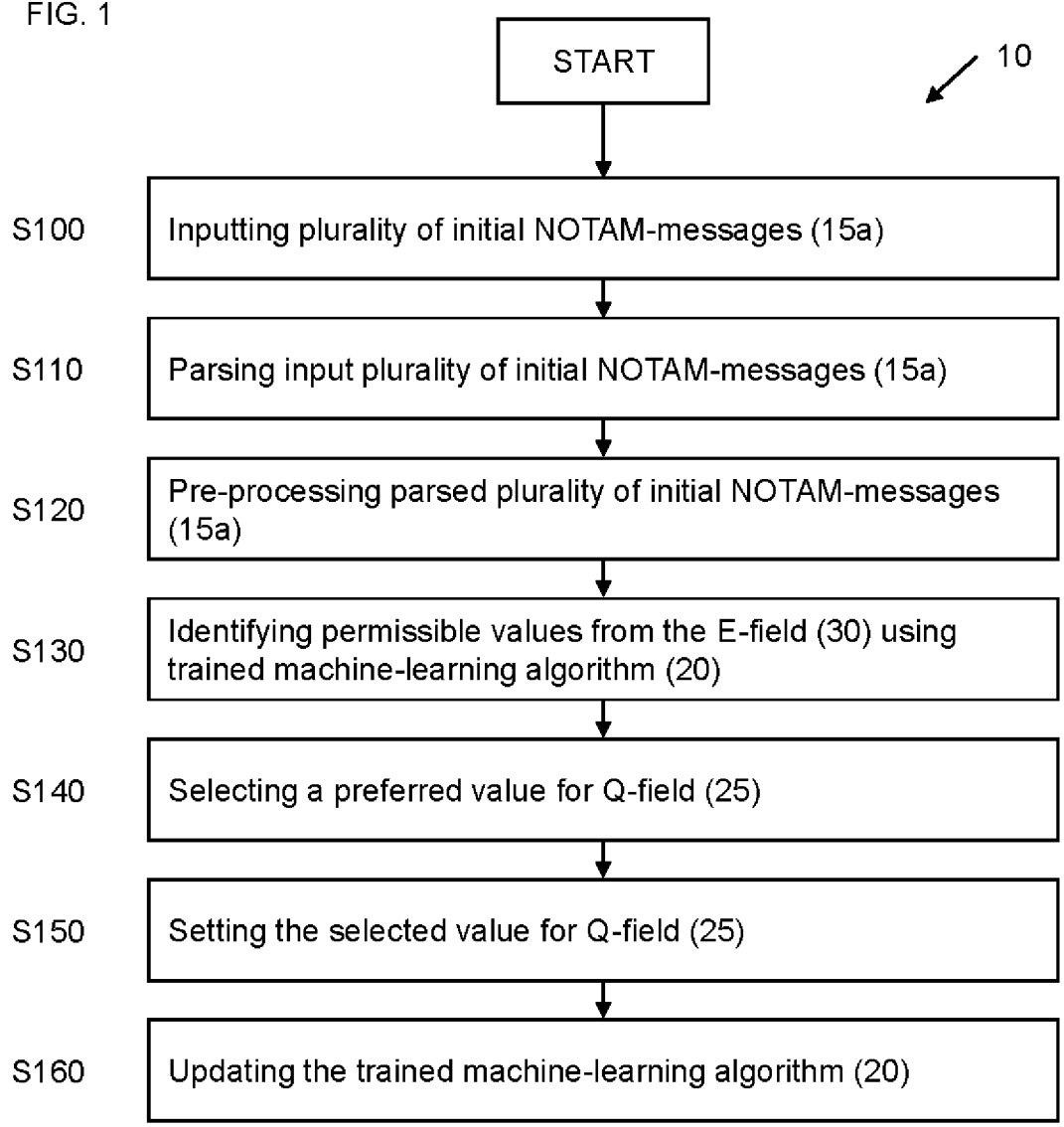
FIG. 1 shows a flow-chart describing a computer-implemented method for correcting initial NOTAM-messages using a trained machine-learning algorithm.

FIG. 1 shows a flow-chart illustrating a computer-implemented method 10 for correcting initial NOTAM-messages 15a using a trained machine-learning algorithm 20. The training of the machine-learning algorithm will be explained later in connection with FIG. 3 and FIG. 4. In step S100 a plurality of initial NOTAM-messages 15a from a plurality of data sources 40 are input.

These plurality of data sources 40 come from different data providers. These data providers are, for example, data providers serviced by a European aeronautical information services database (also referred to as "EAD migrated data providers") and data providers which are not serviced by the European aeronautical information services database (also referred to as "EAD non-migrated data providers"). The EAD migrated data providers are mainly from Europe, and these data providers are using an EAD human-machine-interface (HMI) to publish the initial NOTAM-messages 15a. These initial NOTAM-messages 15a input by the EAD migrated data providers benefit from validation rules in place in the European aeronautical information services database and therefore usually only require little correction. The EAD non-migrated data providers are data providers using third-party software programs to input the initial NOTAM-messages 15a wherein these third-party software programs may not feature a full scope of validation rules for the correction of the initial NOTAM-messages 15a. These initial NOTAM-messages 15a from the EAD non-migrated data providers may therefore require significant correction.

The NOTAM-messages 15 have a standardized structure as defined in Annex 15 to the International Convention on Civil Aviation. This standardized structure is independent of the data source 40.

FIG. 2 shows an exemplary reproduction of one of the plurality of the NOTAM-messages 15 having the standardized structure. The NOTAM-messages 15 include, for example, at least a Q-field 25 and an E-field 30. The Q-field 25 comprises items of data relating to at least one of a traffic 25a, a purpose 25b, a scope 25c, a first NOTAM-code-component 25d, and a second NOTAM-code-component 25e. A purpose of the Q-field 25 is to allow users of the NOTAM-message 15 such as, for example, operators working in flight planning, air traffic controllers, or pilots to filter, to classify and/or to subscribe to certain NOTAM-messages 15. This subscribing is often based on the combination of the first NOTAM-code-component 25d, the second NOTAM-code-component 25e, the traffic 25a, the purpose 25b, and the scope 25c.

These users are usually specifically interested in those NOTAM-messages 15 that are relevant for their field of interest, region and/or area. Missing relevant NOTAM-messages 15 applicable to the field of interest, region and/or area of the users is a safety concern, whilst seeing irrelevant NOTAM-messages 15 causes waste of resources for these users. Receiving accurate information from the Q-field 25 therefore is of high importance to these users. The E-field 30 comprises a string describing a content of the NOTAM-messages 15 in a standardized format.

In the Example shown in FIG. 2 of the one of the plurality of NOTAM-messages 15, a first line of the NOTAM-message 15 provides identification data, a series (letter "A" in first line), sequence number (number "0070"), and year of issue (number "21" standing for the year 2021), as well as the type of operations. The letters "NOTAMN" means a new NOTAM. Alternative letters would be NOTAMR for replacing and NOTAMC for cancelling an existing one of the NOTAM-messages 15, to which a reference to the previous NOTAM would be added).

The Q-field 25 (line starting with the letter "Q") comprises standardized encoded items of data as defined by the International Civil Aviation Organization (ICAO). The items of data of the Q-field 25 can be decoded using standardized tables such as, for example, Appendix B provided by the U.S. Federal Aviation Administration (FAA) which can be found under https://www.faa.gov/air_traffic/publications/at-pubs/notam_html/appendix_b.html (accessed on 1 Mar. 2022).

The Q-field 25 comprises the items of data relating to the traffic 25a (letters "IV" after second forward slash), the purpose 25b (letters "NBO" after third forward slash), the scope 25c (letter "W" after fourth forward slash). The traffic 25a describes whether the NOTAM-message 15 is issued for airplanes following instrument flight rules (IFR) (indicated by letter "I"), airplanes following visual flight rules (VFR) (indicated by letter "V"), or both types of flight rules (indicated by letters "IV"). The purpose 25b describes whether the NOTAM-message 15 is selected for immediate attention of flight crew members (indicated by letter "N"), for pre-flight information bulletin (PIB) entry (indicated by letter "B"), and/or concerning flight operations (indicated by letter "O"). The scope 25c describes the scope of the NOTAM-message 15, wherein the scope may be an Aerodrome (letter "A"), en-route (letter "E"), a navigation warning (letter "W"), or a combination thereof.

The Q-field 25 further comprises the NOTAM-code-component comprising the letter "Q" (first letter "Q" after first forward slash), the first NOTAM-code-component 25d (letters "WW" after first forward slash), and the second NOTAM-code-component 25e (letters "LW" after first forward slash).

The first NOTAM-code-component 25d relates to, for example, items of data relating to an Airspace Organization (codes starting with letter "A"), AGA Facilities and Services (codes starting with letter "F"), or Navigation Warnings (codes starting with letter "W"). In the example of the NOTAM-message 15 above, the first NOTAM-code-component 25d "WW" relates to "significant volcanic activity".

The second NOTAM-code-component 25e relates to, for example, an availability (codes starting with letter "A"), hazard conditions (codes starting with letter "H"), or limitations (codes starting with letter "L"). In the example of the NOTAM-message 15 above, the second NOTAM-code-component 25e "LW" relates to "will take place".

The Q-field 25 may further comprise a lower limit (numbers "000" after fifth forward slash), an upper limit (numbers "999" after sixth forward slash), coordinates (numbers and letters "0444S15030E" after seventh forward slash), and a radius (numbers "999" after seventh forward slash). The Q-field 25 may also comprise items of data relating to the flight information region (FIR) (letters "AYPM" before first forward slash). The lower limit and the upper limit relate to the flight levels expressed in hundreds of feet (ft) (one foot=30.48 cm). The coordinates relate to a geographical location. The radius relates to an operation radius of the NOTAM-message 15 expressed in nautical miles (NM) (one nautical mile is 1.852 kilometers).

The NOTAM-message 15 further comprises the E-field 30 comprising the string describing the content of the NOTAM-message 15. More specifically, the E-field 30 comprises a full description of the Q-field 25 of the NOTAM-message 15, written in English, and encoded using a series of pre-defined abbreviations approved by ICAO.

The NOTAM-message 15 further comprises a B-field containing a start date-time and a C-field containing an end date-time of a reported event. The start and end date-time are reported in UTC format. The NOTAM-messages 15 further comprise optional D-field for specific date-time schedules and an F-field and a G-field for height and/or altitude restrictions. The NOTAM-messages 15 further comprise an A-field indicating an aerodrome or FIR using standardized ICAO codes. In the example of the NOTAM-message 15 above, A-field comprising the letters "AYPM" relates to the FIR "Port Moresby ACC" in Papua New Guinea.

The input plurality of initial NOTAM-messages 15a (see step S100 above) are parsed in step S110. The parsing of the input plurality of the initial NOTAM-messages 15a comprises reviewing the content of the NOTAM messages 15a and identifying at least the Q-field 25 and the E-field 30. The parsing of the input plurality of initial NOTAM-messages 15a may further comprise identifying one or more of the A-field, the B-field, the C-field, the F-field, and/or a G-field. This parsing therefore allows to identify the different fields of the initial NOTAM-messages 15a.

The parsing may further comprise a filtering process being capable of identifying aeronautical entities such as aerodromes or airports from a text of the input initial NOTAM-messages 15a such as the string describing the content of the initial NOTAM-messages 15a in the E-field 30. This filtering is used to extract items of data from the text relating to navigational aids (NAVAIDs) (VOR, DME, NDB, etc.), airspaces (FIR, UIR, restricted area, etc.), designated points, and routes. Coordinates for these items of data can be determined by looking at coordinates of an Aerodrome Reference Point (ARP) present in the A-field. This A-field can contain errors such as FIRs instead of airports. The parsing may therefore further comprise identifying the aerodromes from the string describing the content of the initial NOTAM-message 15a in the E-field 30. This identifying of the aerodromes can also be done if the A-field of the initial NOTAM-message 15a is empty or illegible. This determining of the coordinates for these items of data can be used to correct the initial NOTAM-messages 15a, as will be shown later.

The parsed plurality of initial NOTAM-messages 15a is pre-processed in step S120. The pre-processing in step S120 of the input plurality of initial NOTAM-messages 15a comprises at least one of:

- removing special characters, punctuation marks, stop-words, and/or numerical values from the string describing the content of the input plurality of initial NOTAM-messages 15a;
- replacing abbreviations from the string describing the content of the input plurality of initial NOTAM-messages 15a with a standard nomenclature;
- converting the string describing the content of the input plurality of initial NOTAM-messages 15a into lower case letters;
- tokenizing the string describing the content of the input plurality of initial NOTAM-messages 15a; and/or
- assigning elements of the string describing the content of the input plurality of initial NOTAM-messages 15a an index based on word frequency.

This pre-processing of the input plurality of initial NOTAM-messages 15a allows to improve the correction of the input plurality of initial NOTAM-messages 15a.

A plurality of permissible values for the traffic 25a, the purpose 25b, the scope 25c, the first NOTAM-code-component 25d, and the second NOTAM-code-component 25e are identified from the E-field 30 in step S130. This identifying is done using the trained machine-learning algorithm 20. The machine-learning algorithm 20 comprises, for example, a single multi-output long short-term memory (LSTM) neural network NN and is trained using the method 100 as is described later (see also step S530 and step S540 in the description of FIG. 3 below). The permissible values are assigned a relative probability. The relative probability is a numerical value between zero (0) and one (1) and indicates an expected relevance of the identified permissible values for the traffic 25a, the purpose 25b, the scope 25c, the first NOTAM-code-component 25d, and the second NOTAM-code-component 25e. The relative probability can be normalized such that a sum of the relative probabilities for each of the traffic 25a, the purpose 25b, the scope 25c, the first NOTAM-code-component 25d, and the second NOTAM-code-component 25e equals one (1).

In step S140 a preferred value for one or more of the traffic 25a, the purpose 25b, the scope 25c, the first NOTAM-code-component 25d, and the second NOTAM-code-component 25e is selected. The selecting of the of the preferred value is done using a set of probabilities.

If, for example, the relative probability for the traffic 25a is identified, there are four (4) possible values for the traffic 25a (see above). In this example, the values are "I," "IV," "K," or "V" and the relative probability for these possible values are, for example, [0.01, 0.2, 0.0, 0.79]. In this example, the value "V" has the highest relative probability (0.79) and is therefore selected as the preferred value for the traffic 25a.

The corrected values for the traffic 25a, the purpose 25b, the scope 25c, the first NOTAM-code-component 25d, and the second NOTAM-code-component 25e are set in step S150 to produce the corrected NOTAM-message 15c. The corrected NOTAM-messages 15c are transmitted to the users of the NOTAM-messages 15 directly. In some cases, the corrected NOTAM-messages 15c may further be reviewed by a second instance, such as a human agent or an alternative correction system, before transmission to the users. The corrected NOTAM-messages 15c may also be used for a training of the human agent by providing the corrected NOTAM-messages 15c alongside with the initial NOTAM-messages 15a and/or the validated NOTAM-messages 15b to the human agent.

The trained machine-learning algorithm 20 is, in one aspect, updated in step S160 using at least one of the corrected values for the traffic 25a, the purpose 25b, the scope 25c, the first NOTAM-code-component 25d, and the second NOTAM-code-component 25e and at least one of the input plurality of NOTAM-messages 15, the parsed input plurality of initial NOTAM-messages 15a, or the pre-processed input plurality of initial NOTAM-messages 15a. This updating of the trained machine-learning algorithm 20 further comprises validating the at least one of the corrected values for the traffic 25a, the purpose 25b, the scope 25c, the first NOTAM-code-component 25d, and the second NOTAM-code-component 25e. The updating is done, for example, periodically.

Examples of erroneous initial NOTAM-messages 15a and corrected NOTAM-messages 15c are shown below. The corrected NOTAM-messages 15c are produced using the method 10 as will be explained later.

Example 1

| | |
|---|---|
| Initial NOTAM-message 15a | (A0002/21 NOTAMN<br>Q) KZDV/QNDAS////000/999/3830N10754W005<br>A) KMTJ<br>B) 2101021037<br>C) 2101042000 EST<br>E) /MTJ/DME U/S) |
| Corrected NOTAM-message 15c | (A0002/21 NOTAMN<br>Q) KZDV/QNDAS/IV/BO/AE/000/999/3830N10754W025<br>A) KMTJ B) 2101021037 C) 2101042000EST<br>E) /MTJ/DME U/S) |
| Explanation of corrections | The initial NOTAM-message 15a is missing values for traffic 25a, purpose 25b, and scope 25c. A radius is also adjusted in the corrected version. |

Example 2

| | |
|---|---|
| Initial NOTAM-message 15a | (F0048/21 NOTAMR F0041/21<br>Q) CZVR/QNDAS/IV/BO/AE/000/999/4905N12309W025<br>A) CYVR B) 2101062217 C) 2101082359EST |

| | |
|---|---|
| | E) VANCOUVER DME YVR 115.9 MHZ/CH106X UNMONITORED) |
| Corrected NOTAM-message 15c | (F0048/21 NOTAMR F0041/21<br>Q) CZVR/QNDXX/IV/BO/AE/000/999/4905N12309W025<br>A) CYVR B) 2101062217 C) 2101082359EST<br>E) VANCOUVER DME YVR 115.9 MHZ/CH106X UNMONITORED) |
| Explanation of corrections | The second NOTAM-code-component 25 is not appropriate, because NC45 code "AS" corresponds to "Unserviceable", and the device here is declared as "UNMONITORED", so, in the corrected version, it gets NC45 "XX" (for miscellaneous/plain language description). |

Example 3

| | |
|---|---|
| Initial NOTAM-message 15a | (A0020/21 NOTAMR A0014/21<br>Q) AYPM/QWWXX/IV/NBO/W/000/999/<br>A) AYPM B) 2101050100 C) 2101070600 EST<br>E) CTN. MANAM VOLCANO COORD S04 04 39 E145 02 21 EMITTING VA AND FU<br>UP TO 14000 FT MOVING WNW.PILOT REP.) |
| Corrected NOTAM-message 15c | (A0020/21 NOTAMR A0014/21<br>Q) AYPM/QWWLW/IV/NBO/W/000/999/0444S15030E999<br>A) AYPM B) 2101050100 C) 2101070600EST<br>E) CTN. MANAM VOLCANO COORD S04 04 39 E145 02 21 EMITTING VA AND FU<br>UP TO 14000 FT MOVING WNW.PILOT REP.<br>F) SFC G) UNL) |
| Explanation of corrections | The second NOTAM-code-component 25e could be more specific and is replaced with "LW", which stands for "will take place" (referring to NC23 "WW" = "Significant volcanic activity"). The coordinates & radius field is missing altogether. |

Example 4

| | |
|---|---|
| Initial NOTAM-message 15a | (A0002/21 NOTAMN<br>Q) KZTL/QXXXX////000/999/<br>A) KZTL<br>B) 2101042118<br>C) 2301042118 EST<br>E) ROUTE ZTL.<br>V37 JOTTA, NC TO DOILY, VA MOCA 5900.) |
| Corrected NOTAM-message 15c | (A0002/21 NOTAMN<br>Q) KZTL/QARXX/IV/NBO/E/000/999/3627N08048W027<br>A) KZTL B) 2101042118 C) 2301042118EST<br>E) ROUTE ZTL.<br>V37 JOTTA, NC TO DOILY, VA MOCA 5900.) |
| Explanation of corrections | The first NOTAM-code-component 25d could be more specific and is replaced with "LW", which stands for "ATS route". The initial NOTAM is missing values for traffic, purpose, and scope. The coordinates & radius field is missing altogether. |

Example 5

| | |
|---|---|
| Initial NOTAM-message 15a | (Y0002/20 NOTAMR Y1364/19<br>Q) ZYSH/QXXXX/IV/NBO/A/000/999/4714N12355E005<br>A) ZYQQ B) 2001021223 C) 2004021223 EST<br>E) DUE TO OBST, VISUAL CIRCLING PROCEDURE NOT AVBL.) |
| Corrected NOTAM-message 15c | (Y0002/20 NOTAMR Y1364/19<br>Q) ZYSH/QPKAU/V/NBO/A/000/999/4714N12355E005<br>A) ZYQQ B) 2001021223 C) 2004021223EST<br>E) DUE TO OBST, VISUAL CIRCLING PROCEDURE NOT AVBL.) |

Example 6

| | |
|---|---|
| Initial NOTAM-message 15a | (G1065/20 NOTAMR G0654/20<br>Q) OBBB/QRRXX/IV/BO/W/000/145/2607N05128E015<br>A) OBBB B) 2010110806 C) 2101102359EST<br>E) RESTRICTED AREA OTR53, UPPER LIMIT RAISED TO FL145.<br>REFER TO QATAR AIP ENR 5.1<br>F) SFC G) FL145) |
| Corrected NOTAM-message 15c | (G1065/20 NOTAMR G0654/20<br>Q) OBBB/QRRCH/IV/BO/W/000/145/2607N05128E015<br>A) OBBB B) 2010110806 C) 2101102359EST<br>E) RESTRICTED AREA OTR53, UPPER LIMIT RAISED TO FL145.<br>REFER TO QATAR AIP ENR 5.1.<br>F) SFC G) FL145) |
| Explanation of corrections | Information about a certain restricted area has changed (its vertical limits), so it should have second NOTAM-code-component 25e "CH" = "Changed". |

Example 7

| | |
|---|---|
| Initial NOTAM-message 15a | (A1648/20 NOTAMN<br>Q) OMAE/QWELW/IV/BO/W/000/080/2514N05401E030<br>A) OMAE B) 2008140900 C) 2011141500 EST<br>D) DLY BTN 0900-1500<br>E) MIL ACT WILL TAKE PLACE WI LATERAL LIMITS OF RESTRICTED AREA OMR 77<br>EXCLUDING DUBAI CTA.<br>F) SFC G) 8000FT AMSL) |
| Corrected NOTAM-message 15c | (A1648/20 NOTAMN<br>Q) OMAE/QRRCA/IV/BO/W/000/080/2511N05405E042<br>A) OMAE B) 2008140900 C) 2011141500EST<br>D) DAILY 0900-1500<br>E) MIL ACT WILL TAKE PLACE WI LATERAL LIMITS OF RESTRICTED AREA<br>OMR77 EXCLUDING DUBAI CTA.<br>F) SFC G) 8000FT AMSL) |
| Explanation of corrections | The first NOTAM-code-component 25d and the second NOTAM-code-component 25e point to the wrong subject and operation ("Exercises" + "Will take place") and it should be "RR" = "Restricted area" + "CA" = "Activated". |

Figure 3:
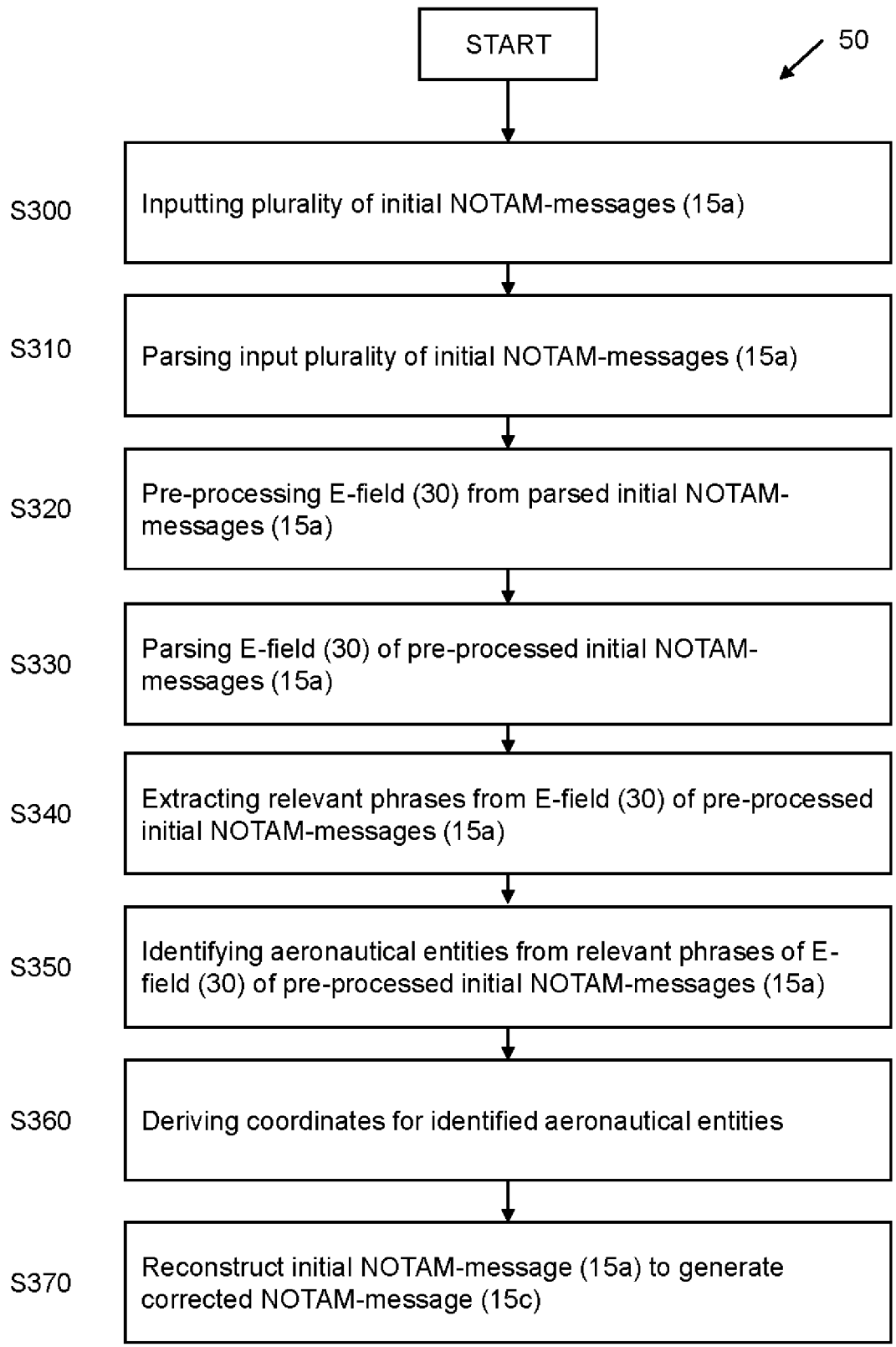
FIG. 3 shows a flow-chart describing a computer-implemented method for correction of the coordinates in the initial NOTAM-messages.

FIG. 3 shows a flow-chart illustrating a computer-implemented method 50 for correction of the coordinates in the initial NOTAM-messages 15a. The method 50 is, for example, used in the correction of the initial NOTAM-messages 15a as described with reference to FIG. 1 (see step S140 above). In step S300 of the method 50 for correction of the coordinates, the plurality of the initial NOTAM-messages 15a are input.

The plurality of the initial NOTAM-messages 15a are parsed in step S310 (see also description of step S110 in FIG. 1). The E-field (30) of the parsed plurality of the initial NOTAM-messages 15a is pre-processed in step S320. The pre-processing of the E-field 30 in step S320 comprises:

removing special characters, certain punctuation marks, stop-words, and numerical values (such as, apostrophes (" "), exclamation marks (!), question marks (?)) from the E-field 30;

replacing abbreviations with standard nomenclature (such as, replacing the word "DANGER"/"DANGEROUS"/ "DNG" and "AREA"/"ZONE" with ICAO standardized abbreviations such as "DAREA" with exception of, for example, not replacing "AS", which is the ICAO abbreviation for "ALTOSTRATUS", because the acronym also is a common English word, and thus ambiguous, but, for example, replacing abbreviations with standard nomenclature: replacing ICAO abbreviation "FLTCK" with "Flight check"); and selectively converting the text into lower case letters.

The pre-processed E-field 30 of the initial NOTAM-messages 15a is parsed in step S330 using the parser. The parsing is done, for example, using at least one of a pre-trained English chunking parser model from OpenNLP (http://opennlp.apache.org/) or a natural language processing toolkit such as a processing toolkit licensed under the Apache software license (for example, Version 2.0). This parser takes as input a sentence/string and returns a parse tree, according to a pre-defined phrase structure grammar of the English language. This parse tree is then used to extract phrases that are likely to be relevant for aviation-based items of data of the input plurality of initial NOTAM-messages 15a. This parse tree is therefore used to identify phrases that are likely to be relevant for identifying the coordinates of aeronautical entities mentioned in the E-field 30 of the initial NOTAM-messages 15a. These identified phrases are extracted in step S340.

The extracted phrases are filtered, and the aeronautical entities are identified in step S350. This identifying of the aeronautical entities is done by extracting natural identifiers out of the extracted phrases from step S340, and then performing a mixed spatial-natural identifier query in a trusted aeronautical data source, such as from European AIS Database from Eurocontrol (EAD). This identifying is done, for example, by performing a query by a natural key (designator/name and feature type) in an EAD data source.

In step S360 the coordinates are derived from the identified aeronautical entities using associated stored locations and are used for correction of the initial NOTAM-messages 15a. In step S370, the initial parsed NOTAM-message 15a is reconstructed using the derived coordinates and thereby the corrected NOTAM-message 15c is generated. This reconstructing comprises replacing initial values for the coordinates in the initial NOTAM-message 15a with the corresponding derived corrected coordinates. The reconstructing may further comprise additional modifications. For example, if the lower limit and the upper limit in the Q-field 25 are missing, these missing values for the lower limit and the upper limit are filled with values from the F-field and/or the G-field or set to default values such as, for example, 000/999. If, for example, the radius is missing in the Q-field 25 of the initial NOTAM-message 25, the radius is filled with default values based the first NOTAM-code-component 25d, the second NOTAM-code-component 25e, and the scope 25c derived from the Q-field 25.

Figure 4:
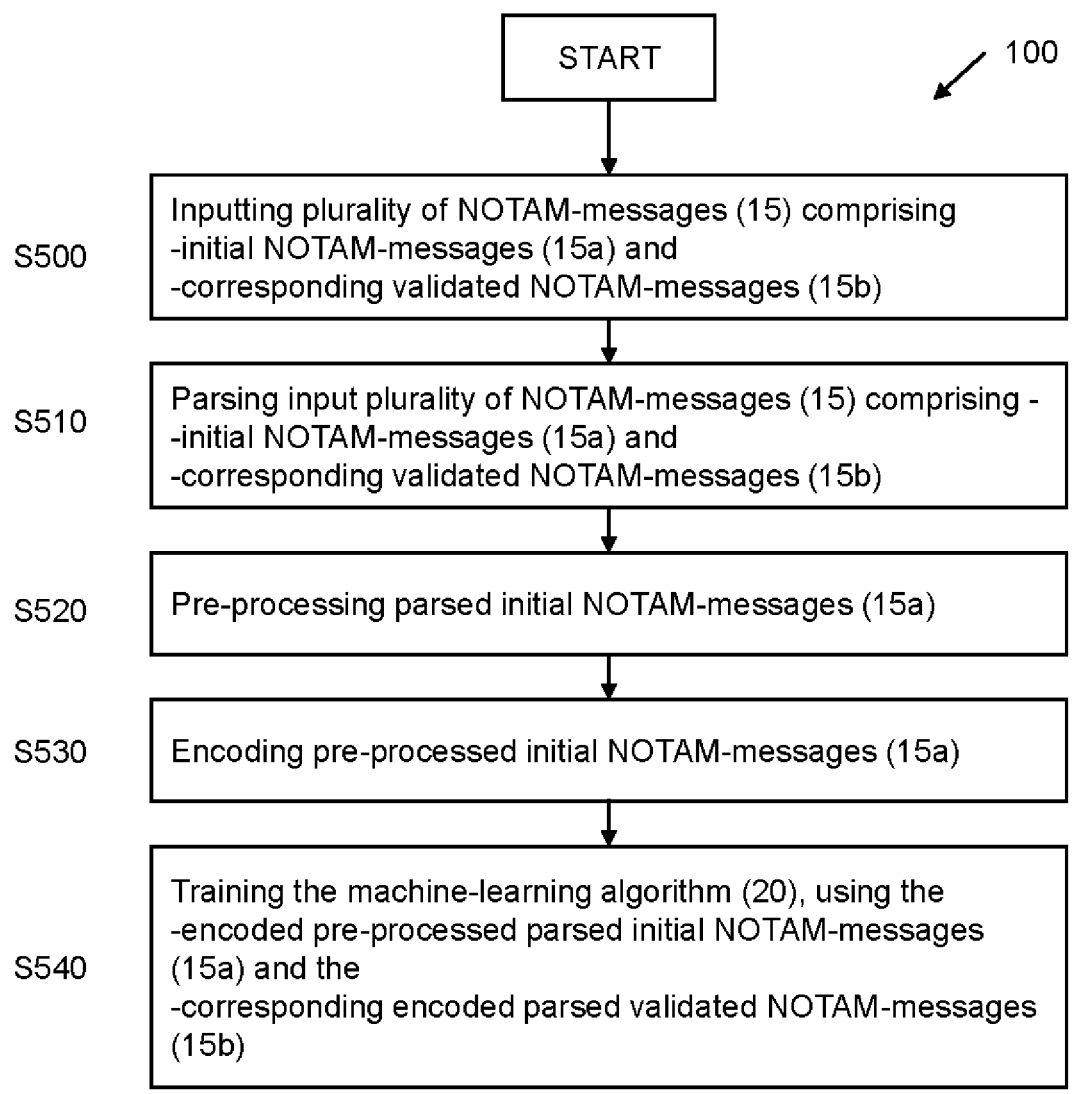
FIG. 4 shows a flow-chart describing a computer-implemented method for the training of the machine-learning algorithm.

FIG. 4 shows a flow-chart illustrating a computer-implemented method 100 for the training of the machine-learning algorithm 20. The plurality of NOTAM-messages 15 are input in step S500. The input plurality of NOTAM-messages 15 comprise initial NOTAM-messages 15a and corresponding validated NOTAM-messages 15b. The initial NOTAM-messages 15a and the corresponding validated NOTAM-messages 15b comprise at least the Q-Field 25 and an E-field 30. The Q-field 25 of the initial NOTAM-messages 15a and the corresponding validated NOTAM-messages 15b comprise items of data relating to at least one of the traffic 25a, the purpose 25b, the scope 25c, the first NOTAM-code-component 25d, and the second NOTAM-code-component 25e. The E-field 30 of the initial NOTAM-messages 15a and the corresponding validated NOTAM-messages 15b comprise a string describing the content of the NOTAM-messages 15.

The input plurality of the initial NOTAM-messages 15a and the corresponding validated NOTAM-messages 15b are parsed in step S510. The parsing comprises identifying at least the Q-field 25 and the E-field 30 (see also parsing in step S110 above).

The E-field 30 of the parsed plurality of the initial NOTAM-messages 15a are pre-processed in step S520. The pre-processing of the initial NOTAM-messages 15a comprises at least one of:

removing special characters, punctuation marks, stopwords, and/or numerical values from the string describing the content of the input plurality of initial NOTAM-messages 15a;

replacing abbreviations from the string describing the content of the input plurality of initial NOTAM-messages 15a with a standard nomenclature;

converting the string describing the content of the input plurality of initial NOTAM-messages 15a into lower case letters;

tokenizing the string describing the content of the input plurality of initial NOTAM-messages 15a; and/or assigning elements of the string describing the content of the input plurality of initial NOTAM-messages 15a an index based on word frequency.

The pre-processed initial NOTAM-messages 15a are encoded in step S530. The encoding of the initial NOTAM-messages 15a comprises setting values for the items of data of the Q-field 25 of the input pre-processed initial NOTAM-messages 15a. The encoding in step S530 of the Q-field 25 of the initial NOTAM-messages 15a is done using one-hot encoding to produce a vector of binary values. If, for example, the possible values for the traffic 25a are "I" with probability 0 (min), "IV" with probability 1 (max), "K" with probability 0 (min), "V" with probability 0 (min), the one-hot encoding in step S530 would yield "[0, 1, 0, 0]". The one-hot encoding is a process of converting categorical data variables for use in the machine-learning algorithm 20 to improve a prediction of the machine-learning algorithm 20. The categorical data variable is a variable that can take on one of a limited number of possible values (for example, the purpose 25b can take one of the values "B", "BO", "K", "M", or "NBO" whereas the traffic can take one of the values "I", "IV", "K" or "V". Each categorical value of the categorical data variables is assigned a category column and a binary value for these columns.

This encoding in step S530 is used to correct the items of data of the Q-field 25 of the initial NOTAM-messages 15a. The corrected NOTAM-messages 15c are produced from the initial NOTAM-messages 15a using the machine learning algorithm 20. This producing of the corrected NOTAM-messages 15c comprises correcting the items of data relating to at least one of the traffic 25a, the purpose 25b, the scope 25c, the first NOTAM-code-component 25d, and the second NOTAM-code-component 25e.

This correcting of the items of data is modelled as a classification problem which is solved using the machine-learning algorithm 20. The machine-learning algorithm 20 comprises, for example, a single multi-output long short-term memory (LSTM) neural network NN. This neural network NN takes as input the text of E-field 30 of the initial NOTAM-messages 15a. This input is encoded and padded to fit the input size of the neural network NN. The encoding of the E-field 30 comprises setting an index value for the content of the E-field 30. This setting of the index value for the content of the E-field 30 is done using a table comprising a list of most frequent words having assigned the index code for items in the list. The neural network NN comprises five output branches. These output branches are the traffic 25a, the purpose 25b, the scope 25c, the first NOTAM-code-component 25d, the second NOTAM-code-component 25e. The neural network NN produces a set of probabilities for each of these five output branches. The neural network therefore produces one set of probabilities for the traffic 25a, the purpose 25b, the scope 25c, the first NOTAM-code-component 25d, the second NOTAM-code-component 25e. A highest probability within the set of probabilities indicates the class which is most likely to correspond to the current initial NOTAM-message 15a.

A predicted class corresponds to one of the possible values for the traffic 25a, the purpose 25b, the scope 25c, the first NOTAM-code-component 25d, the second NOTAM-code-component 25e and will be compared to a ground truth comprising the validated NOTAM-messages 15b to evaluate the performance of the model in step S540. For the first three of the output branches (e.g., the traffic 25a, the purpose 25b, the scope 25c) there exist, for example, the following possible classes:

Traffic: [I, IV, K, V]; —
Purpose: [B, BO, K, M, NBO]; or
Scope: [A, AE, AW, E, K, W].

The last two of the output branches (e.g., the first NOTAM-code-component 25d, the second NOTAM-code-component 25e) correspond to the correction of the NOTAM-message 15 as follows: the fourth output branch relates to the first NOTAM-code-component 25d which identifies the subject being reported. The fifth output branch relates to the second NOTAM-code-component 25e which identifies the status of operation of the subject being reported (see also summary of the contents of the Q-field 25 of the NOTAM-messages 15 above).

The machine-learning algorithm 20 is trained in step S540 based on the set values for the items of data of the Q-field 25 of the input encoded initial NOTAM-messages 15a and the values of the for the items of data of the Q-field 25 of the validated NOTAM-messages 15b. The training of classification models dealing with the correction of the initial-NOTAM-messages 15a (e.g., traffic 25a, the purpose 25b, the scope 25c, the first NOTAM-code-component 25d, and the second NOTAM-code-component 25e) are implemented, for example, in Python programming language.

The following languages may also be used in the training of the classification models:

Keras (with a TensorFlow backend) is an open-source library which offers support for developing artificial neural networks and is used for the implementation of the LSTM model;
Scikit-learn (sklearn) is used for encoding the training data for feeding it into the model for training and for testing the trained model;
NLTK is used within the dataset for the pre-processing (see step S520), for its stop-word corpus; and/or
NumPy is a library featuring optimized operations with multidimensional arrays; —Pandas is used for data manipulation and analysis.

Figure 5:
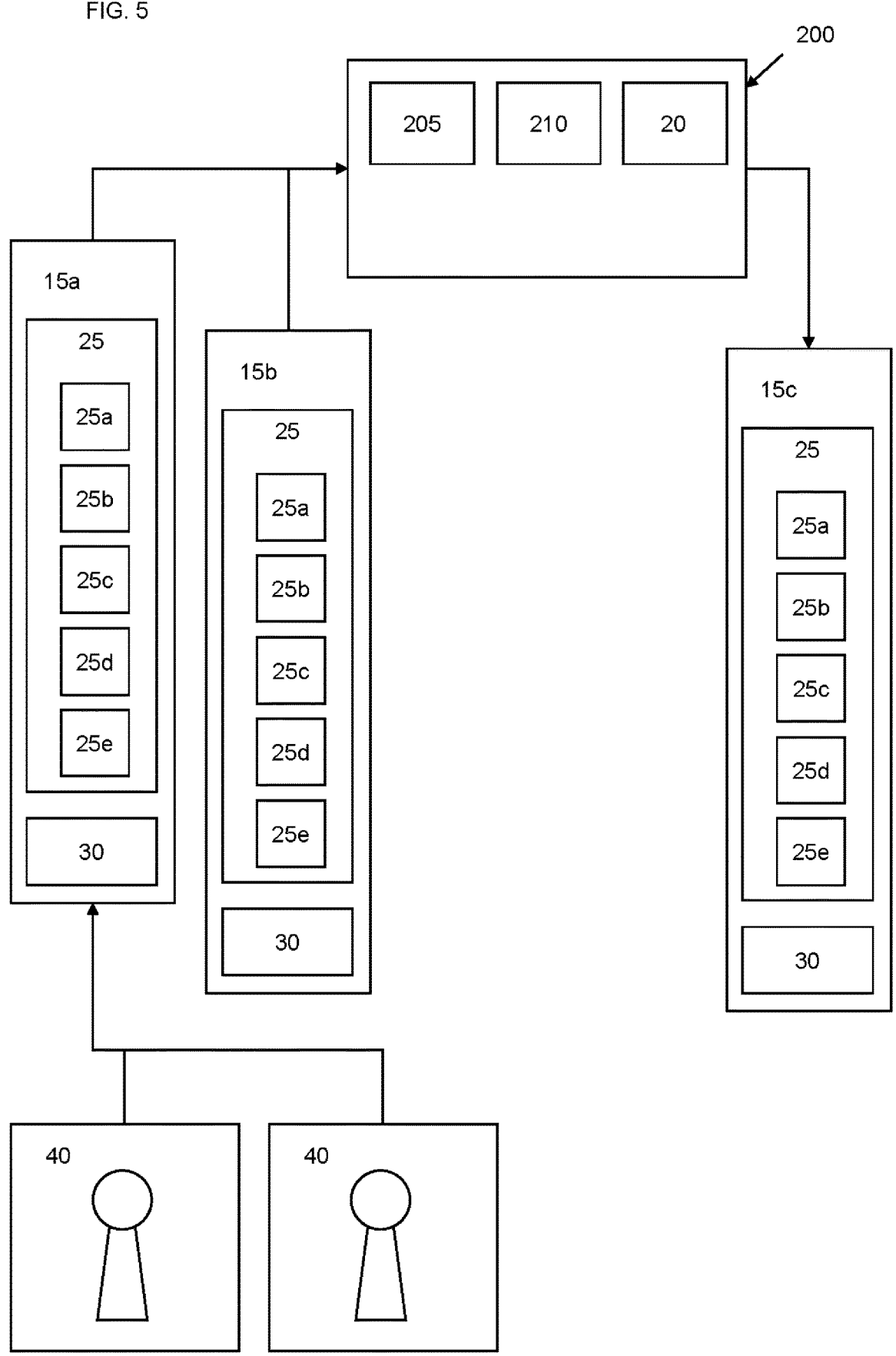
FIG. 5 shows a processing apparatus comprising a processor and a memory.

FIG. 5 shows an exemplary processing apparatus 200 which can be used for implementing the method set out in this document. The processing apparatus 200 comprises a processor 205 and a memory 210 for storing and carrying out the method 10, 50, 100. A plurality of the initial NOTAM-messages 15a is input into the processing apparatus 200. These initial NOTAM-messages 15a are received from a plurality of the data sources 40 (see description of FIG. 1 above). The processing apparatus 200 produces the plurality of the corrected NOTAM-messages 15c, as described with reference to FIG. 4.

The processing apparatus 200 or another processing apparatus is used to train the machine-learning algorithm 20 using the input plurality of initial NOTAM-messages 15a and a plurality of the corresponding validated NOATAM-messages 15b, as described with reference to FIG. 1.

The plurality of the initial NOTAM-messages 15a, the plurality of the validated NOATAM-messages 15b, and the plurality of the corrected NOTAM-messages 15c comprise the Q-field 25 and the E-field 30 (see description of FIG. 1 above). The Q-field 25 comprises at least one of the traffic 25a, the purpose 25b, the scope 25c, the first NOTAM-code-component 25d, and/or the second NOTAM-code-component 25e (see description of FIG. 1 above).

REFERENCE NUMERALS 10 computer-implemented method
15 NOTAM-message
15a initial NOTAM-message
15b validated NOTAM-message
15c corrected NOTAM-message
20 machine-learning algorithm
25 Q-field
25a traffic
25b purpose
25c scope
25d first NOTAM-code-component
25e second NOTAM-code-component
30 E-field
40 data sources
50 computer-implemented method
100 computer-implemented method
200 processing apparatus
205 processor
210 memory

What is claimed is:

1. A computer-implemented method for correcting initial NOTAM-messages using a trained machine-learning algorithm, the method comprising the steps of:
inputting a plurality of initial NOTAM-messages from a plurality of data sources, the initial NOTAM-messages comprising at least a Q-field and an E-field, wherein the Q-field comprises items of data relating to at least one of a traffic, a purpose, a scope, a first NOTAM-code-component, and a second NOTAM-code-component, and wherein the E-field comprises a string describing a content of the initial NOTAM-messages;
identifying, from the E-field and using the trained machine-learning algorithm, a plurality of permissible values for the traffic, the purpose, the scope, the first NOTAM-code-component, and the second NOTAM-code-component;
selecting for the Q field a preferred value for one or more of the traffic, the purpose, the scope, the first NOTAM-code-component, and the second NOTAM-code-component, wherein selecting of the preferred value is done using a set of probabilities; and
setting in the Q-field the selected value for the traffic, the purpose, the scope, the first NOTAM-code-component, and the second NOTAM-code-component as corrected values for the traffic, the purpose, the scope, the first NOTAM-code-component, and the second NOTAM-code-component to produce corrected NOTAM-messages of erroneous initial NOTAM-messages in which at least one of the following is true:
the Q-Field is missing at least one of the corresponding items of data,
the items of data in the Q-Field are not appropriate.

2. The computer-implemented method according to claim 1, further comprising:
parsing the input plurality of initial NOTAM-messages, wherein the parsing comprises identifying at least the Q-field and the E-field.

3. The computer-implemented method according to claim 1, further comprising:
pre-processing the input plurality of initial NOTAM-messages.

4. The computer-implemented method according to claim 3, wherein the pre-processing comprises at least one of:
- removing special characters, punctuation marks, stopwords, and/or numerical values from the string describing the content of the input plurality of initial NOTAM-messages;
- replacing abbreviations from the string describing the content of the input plurality of initial NOTAM-messages with a standard nomenclature;
- converting the string describing the content of the input plurality of initial NOTAM-messages into lower case letters;
- tokenizing the string describing the content of the input plurality of initial NOTAM-messages; and/or
- assigning elements of the string describing the content of the input plurality of initial NOTAM-messages an index based on word frequency.

5. The computer-implemented method according to claim 1, further comprising:
- updating the trained machine-learning algorithm using at least one of the corrected values for the traffic, the purpose, the scope, the first NOTAM-code-component, and the second NOTAM-code-component and at least one of the input plurality of NOTAM-messages, the parsed input plurality of initial NOTAM-messages, or the pre-processed input plurality of initial NOTAM-messages.

6. The computer-implemented method according to claim 5, wherein:
- the updating further comprises validating the at least one of the corrected values for the traffic, the purpose, the scope, the first NOTAM-code-component, and the second NOTAM-code-component.

7. The computer-implemented method according to claim 5, wherein:
- the updating is done periodically.

8. The computer-implemented method according to claim 1, wherein:
- the trained machine-learning algorithm comprises a single multi-output Long short-term memory (LSTM) neural network (NN).

9. A computer-implemented method for training of a machine-learning algorithm to produce corrected NOTAM-messages of erroneous initial NOTAM-messages in which at least one of the following is true: the Q-Field is missing at least one of the corresponding items of data, the items of data in the Q-Field are not appropriate, the method comprising the steps of:
- inputting a plurality of NOTAM-messages, wherein the input plurality of NOTAM-messages comprise initial NOTAM-messages and corresponding validated NOTAM-messages, wherein the initial NOTAM-messages and the corresponding validated NOTAM-messages comprise at least a Q-Field and an E-field, wherein the Q-field comprises items of data relating to at least one of a traffic, a purpose, a scope, a first NOTAM-code-component, and a second NOTAM-code-component, and wherein the E-field comprises a string describing a content of the NOTAM-messages;
- encoding the initial NOTAM-messages, wherein the encoding comprises setting values for the items of data of the Q-field of the input pre-processed initial NOTAM-messages;
- training the machine-learning algorithm based on the set values for the items of data of the Q-field of the input encoded initial NOTAM-messages and the values of the for the items of data of the Q-field of the validated NOTAM-messages.

10. The computer-implemented method according to claim 9, further comprising:
- parsing the initial NOTAM-messages and the corresponding validated NOTAM-messages, wherein the parsing comprises identifying at least the Q-field and the E-field.

11. The computer-implemented method according to claim 9, further comprising:
- pre-processing the E-field of the initial NOTAM-messages.

12. The computer-implemented method according to claim 11, wherein the pre-processing comprises at least one of:
- removing special characters, punctuation marks, stopwords, and/or numerical values from the string describing the content of the E-field of the initial NOTAM-messages;
- replacing abbreviations from the string describing the content of the E-field of the initial NOTAM-messages with a standard nomenclature;
- converting the string describing the content of the E-field of the initial NOTAM-messages into lower case letters;
- tokenizing the string describing the content of the E-field of the initial NOTAM-messages; and/or
- assigning elements of the string describing the content of the E-field of the initial NOTAM-messages an index based on word frequency.

13. The computer-implemented method according to claim 9, wherein: the encoding of the Q-field of the initial NOTAM-messages is done using one-hot encoding.

14. A data processing apparatus comprising a processor and a memory for carrying out the method of claim 1.

15. A data processing apparatus comprising a processor and a memory for carrying out the method of claim 9.

16. A computer program embedded in a non-transitory medium comprising instructions which, when the program is executed by a computer, cause the computer to carry out the method of claim 1.

17. A computer program embedded in a non-transitory medium comprising instructions which, when the program is executed by a computer, cause the computer to carry out the method of claim 9.

18. A non-transitory computer-readable medium comprising instructions which, when executed by a computer, cause the computer to carry out the method of claim 1.

19. A non-transitory computer-readable medium comprising instructions which, when executed by a computer, cause the computer to carry out the method of claim 9.

20. The method of claim 1, used for one of correcting NOTAM-messages in flight planning operations, in air traffic control, and providing information to pilots.

* * * * *